Patented Aug. 28, 1951

2,566,251

UNITED STATES PATENT OFFICE 2,566,251

HOMOGENEOUS COPOLYMERS OF ALIPHATIC CONJUGATED DIOLEFIN HYDROCARBONS WITH POLYMERIZABLE VINYL CARBOXYLATES

Lawrence M. Richards, Wilmington, Del., assignor to E. I. du Pont de Nemours & Company, Wilmington, Del., a corporation of Delaware No Drawing. Application June 17, 1946, Serial No. 677,399

7 Claims. (Cl. 260—45.5)

1

This invention relates to polymeric compositions of matter, to a process for preparing interpolymers, and to coating compositions containing such interpolymers. More particularly, this invention relates to new interpolymers of aliphatic conjugated diolefins with vinyl carboxylates, to a process for their preparation, and to articles coated or impregnated with said interpolymers.

It has been known that certain polymerizable monomeric materials, although readily polymerizable by themselves without difficulty by ordinary methods, cannot be made to polymerize in combination with certain other polymerizable monomers to produce desirable interpolymers. For example, aliphatic conjugated diolefins, such as butadiene and vinyl carboxylates, such as vinyl acetate, have long been known and are readily capable of polymerizing alone. However, attempts to obtain desirable interpolymers with these materials have not heretofore been successful.

It is an object of this invention to provide new and useful interpolymers capable of forming tough, flexible, and continuous films of excellent tensile strength. A further object is the provision of interpolymers from vinyl carboxylates and aliphatic conjugated diolefins. Another object is to provide a practical process for interpolymerizing vinyl carboxylates and aliphatic conjugated diolefins. A still further object is the provision of new interpolymers of polyvinyl acetate with butadiene and a novel process for their preparation. Another object is to provide a coating composition containing the new interpolymers. An additional object is to produce coated or impregnated articles containing a tough, flexible and continuous polymeric coating of high tensile strength. Other objects will appear hereinafter.

These objects are accomplished by the following invention which comprises polymerizing an aqueous dispersion of a polymerizable vinyl ester of an organic saturated monocarboxylic acid at a temperature in excess of 20° C., subsequently adding an aliphatic conjugated diolefin to the said aqueous dispersion of the polymerized vinyl ester, and polymerizing said diolefin while so dispersed with the polymerized vinyl ester at a temperature in excess of 30° C. It has been discovered that homogeneous copolymers of a polymerizable vinyl saturated monocarboxylate with an aliphatic conjugated diolefin can be prepared by carrying out the process in two stages; that is, the vinyl ester is polymerized substantially completely to the polymeric vinyl ester in the first stage, subsequently the alphatic conjugated diolefin is added to the polymerized vinyl ester, and then interpolymerization is effected in the second stage.

In a preferred embodiment of this invention an aqueous emulsion of the vinyl monocarboxylate is prepared and substantially all of said vinyl monocarboxylate is polymerized while dispersed in said aqueous emulsion, then an aqueous emulsion of the aliphatic conjugated diolefin is added to the dispersed polymerized vinyl ester, and subsequently said diolefin is polymerized while so dispersed in aqueous emulsion with the polymerized vinyl ester. The resulting interpolymer so formed can be isolated or can be used in the dispersed form for the preparation of film coatings and impregnated products, such as textile materials and paper. Films formed from these interpolymers are tough, flexible, continuous and of high tensile strength.

The temperature at which the vinyl monocarboxylate is polymerized is in excess of 20° C. and preferably between 30° C. and 70° C. The interpolymerization of the monomeric conjugated diolefin, such as butadiene-1,3, with the polyvinyl monocarboxylate, such as polyvinyl acetate, is carried out above 30° C., and preferably at temperatures ranging from 50° to 90° C.

The time required for polymerization of the vinyl monocarboxylates in the first stage, and also for the subsequent interpolymerization of the resulting polyvinyl ester with the conjugated diolefin, is largely dependent upon the conditions used and the particular ingredients employed, and can vary from a few minutes to several days, being longer at the lower temperatures. It is important to carry out the process of this invention in two stages; that is the vinyl ester is first polymerized substantially completely, that is the extent of at least 90%, to the polymeric vinyl ester, for example polyvinyl acetate, and to this is added the conjugated diolefin, such as butadiene-1,3, and then interpolymerization is effected.

The conjugated diolefins and vinyl monocarboxylates are preferably employed in weight percentages corresponding to between 1 and 50% of the diolefin and between 99 and 50% of the vinyl carboxylate. For example, an emulsion of the major component, such as vinyl acetate is polymerized substantially completely, then an emulsion of the monomeric minor component, such as 40% butadiene by weight of said vinyl acetate is added to the dispersion of the polymerized major component and the mixture is completely polymerized.

Polymerization of the vinyl esters should be effected in substantially neutral media and may include any of the usual emulsifying agents, such as alkali metal salts of the sulfuric acid esters of lauryl, myristyl, or other higher aliphatic alcohols, or the triethanolamine salts of lauric or palmitic acid, and quaternary ammonium salts such as cetyl trimethyl ammonium bromide. The emulsion preferably includes a small amount of a peroxy compound, for example, hydrogen peroxide, benzoyl peroxide, or an ammonium or alkali metal persulfate as a polymerization catalyst. However, such catalysts may in some instances be omitted. These emulsifying agents and catalysts may be used in any of the well known proportions for the preparation of such emulsions.

After completing the polymerization and interpolymerization, the interpolymers may be isolated from the dispersion by coagulation in any of the usual ways, for example, with a solution of salt, or any of a variety of coagulating agents such as aqueous solutions of sodium sulfate, calcium chloride, or with hydrochloric or sulfuric acids. The coagulated products on removal from the mixture are washed with water to free from foreign material and then dried. The dispersed interpolymers prior to isolation or prepared dispersions of the interpolymers subsequent to isolation can be used to coat or impregnate various articles, such as paper, fabrics and the like.

The following examples, in which parts are given by weight unless otherwise indicated, further illustrate the invention.

Example I

A polyvinyl acetate dispersion substantially free of monomer is prepared in a suitable reactor by stirring at 40° C. under nitrogen for 22 hours 1000 parts of vinyl acetate with a mixture, adjusted in the aqueous phase with 85% phosphoric acid to a pH of 7.0, and composed of 3000 parts of copper-free water, 22.2 parts of technical sodium dodecyl sulfate, 10 parts of potassium persulfate, and 10 parts of dipotassium hydrogen phosphate.

A stainless steel autoclave is charged with 3000 parts of the polyvinyl acetate dispersion just described, and to this a solution composed of 2,250 parts of copper-free distilled water, 33.4 parts of technical sodium dodecyl sulfate, 15 parts of potassium persulfate, and 7.5 parts of dipotassium hydrogen phosphate is added. The autoclave is flushed with nitrogen and sealed. While the contents are stirred vigorously, 750 parts of liquid butadiene is injected into the autoclave under sufficient pressure as to maintain the butadiene in the liquid state. The autoclave is then heated to 60° C. and stirring is continued for 18 hours, at the end of which time the pressure has dropped to atmospheric pressure. The pressure reaches a maximum of approximately 100 lbs./sq. in. and continually decreases as polymerization proceeds. The dispersed polymerized product is removed from the autoclave and found to have a solids content of 22.6%. Continuous films may be cast from this dispersion simply by evaporating the water. These films are tough, non-tacky, flexible, and insoluble in common organic solvents such as acetone, benzene, chloroform, and the like. Such a film cast at 25° C. and tested without heating showed a tensile strength at 50% humidity of 990 lbs./sq. in. at 25% elongation.

Example II

A dispersion of polyvinyl acetate is prepared by agitating for 16 hours under nitrogen at 40° C. a mixture of 50 parts of vinyl acetate with 150 parts of a solution composed of 1050 parts of copper-free distilled water, 3.5 parts of technical sodium dodecyl sulfate, 1.79 parts of ammonium persulfate, and 1.75 parts of dipotassium hydrogen phosphate.

The butadiene/polyvinyl acetate two-stage interpolymer is then prepared by rocking in a suitable reactor the composition described below under nitrogen at 40° C. for 58 hours:

| | Parts |
|---|---|
| Polyvinyl acetate dispersion (Prepared as described above) | 200 |
| Water (copper-free) | 150 |
| Technical sodium dodecyl sulfate | 2.2 |
| Ammonium persulfate | 1.0 |
| Dipotassium hydrogen phosphate | 0.5 |
| Butadiene | 35 |

At the end of the polymerization procedure, the resulting dispersion is steamed to remove traces of residual monomer, cooled, and filtered. Evaporation of the water leaves a transparent, colorless film which is slightly brittle. This tensile strength of this film as cast is 1900 lbs./sq. in. at 40% elongation. Baking of this cast film for 4 hours at 100° C. increases the tensile strength to 2800 lbs./sq. in. at 196% elongation.

Example III

Another dispersion is prepared as described above in Example II, and from this a film is cast and baked in an oven at 70–75° C. for 23 days, at the end of which time the tensile strength is 5200 lbs./sq. in. at 4% elongation. Under these severe conditions, however, the film may turn to a brown color.

At 50% humidity, a film cast from the above dispersion and baked at 70° C. for 1 hour shows a tensile strength of 2900 lbs./sq. in. at 95% elongation. Even after soaking for 24 hours in water at 25° C., the tensile strength of this film is 1200 lbs./sq. in. at 29% elongation.

Example IV

Porous paper is impregnated with a butadiene/polyvinyl acetate two-stage copolymer prepared as described in Example II. The impregnated paper is air-dried and then baked at 70° C. for 2 hours. The results of tests made in accordance with standard procedures used in the paper industry are tabulated below:

| Sheet Number | Per Cent Inter-Polymer Resin | 50% Humidity $T_B/E_B$[1] | Soaked in Water for 24 hours $T_B/E_B$[1] | Elmendorf Tear Strength | Smith Tabor Stiffness | Mullen Bursting Strength |
|---|---|---|---|---|---|---|
| 1 | 22.2 | 3240/7 | 462/11 | 45 | 160 | 150 |
| 2 | 23.7 | 3075/6.7 | 460/11 | 35 | 138 | 136 |
| 3 | 28.0 | 3400/6.7 | 510/10 | 43 | 157 | 148 |
| Control | 0.0 | 425/3.8 | 0/0 | 19 | 49 | 38 |

[1] $T_B/E_B$ = tensile strength in lbs. per sq. in./percent elongation.

Vinyl esters of aliphatic saturated monocarboxylic acids of less than 5 carbon atoms, such as vinyl acetate, vinyl propionate and vinyl butyrate are preferred for use in preparing the new interpolymers of this invention. Of these, vinyl acetate is particularly preferred. Conjugated diolefins containing not more than six carbon atoms, including isoprene (2-methyl butadiene-1,3), 2,3-dimethylbutadiene-1,3, and 2-ethylbutadiene-1,3, are preferred for use in this invention. Of these, butadiene-1,3, because of its ease of polymerization and ready availability, is particularly preferred.

Although the products of this invention are usually prepared in dispersed form, they can also be prepared in solution, for example in benzene, methanol, acetone and the like. The polymerization and interpolymerization may be accelerated by heating to the higher temperatures, by irradiating with ultraviolet light, and by the addition of polymerization catalysts. While the process has been illustrated with polymerizations in the presence of nitrogen, other inert gases may be used.

The interpolymers of this invention are useful and valuable for various commercial purposes. They may be used in impregnation of paper, in leather finishes, and as coating compositions for fabrics. These interpolymers on exposure to air give tough, flexible, non-tacky, and insoluble films. They may also be crosslinked by conventional techniques, such as by peroxide and sulfur vulcanization.

As many apparently widely different embodiments of this invention may be made without departing from the spirit and scope thereof, it is to be understood that I do not limit myself to the specific embodiments thereof except as defined in the appended claims.

I claim:

1. A process for preparing homogeneous copolymers of a monomeric aliphatic conjugated diolefin hydrocarbon of not more than 6 carbon atoms and a polymerizable vinyl ester of an organic saturated monocarboxylic acid of less than 5 carbon atoms in which the carboxyl group is the sole substituent, which comprises first polymerizing said vinyl ester alone in aqueous dispersion at a temperature in excess of 20° C. until an aqueous dispersion of a homopolymer of said vinyl ester is formed, subsequently adding to said aqueous polymer dispersion said monomeric diolefin hydrocarbon and forming a resulting aqueous dispersion containing, based on the combined weights of the monomeric diolefin hydrocarbon and the homopolymeric vinyl ester, from 1 to 50% by weight of said monomeric diolefin hydrocarbon and from 99 to 50% by weight of said homopolymeric vinyl ester, then copolymerizing in said resulting aqueous dispersion at a temperature in excess of 30° C. said monomeric diolefin hydrocarbon and said homopolymeric vinyl ester as the sole copolymerizable components therein until a homogeneous copolymer thereof is formed.

2. A process for preparing homogeneous copolymers of monomeric butadiene-1,3 and vinyl acetate which comprises first polymerizing said vinyl acetate alone in aqueous dispersion at a temperature in excess of 20° C. until an aqueous dispersion of a homopolymer of said vinyl acetate is formed, subsequently adding to said aqueous polymer dispersion said monomeric butadiene-1,3 and forming a resulting aqueous dispersion containing, based on the combined weights of the monomeric butadiene-1,3 and the homopolymeric vinyl acetate, from 1 to 50% by weight of said monomeric butadiene-1,3 and from 99 to 50% by weight of said homopolymeric vinyl acetate, then copolymerizing in said resulting aqueous dispersion at a temperature in excess of 30° C. said monomeric butadiene-1,3 and said homopolymeric vinyl acetate as the sole copolymerizable components therein until a homogeneous copolymer thereof is formed.

3. A homogeneous copolymer consisting of from 1 to 50% by weight of butadiene-1,3 and from 99 to 50% by weight of vinyl acetate, said copolymer being the product obtained as set forth in claim 2.

4. A homogeneous copolymer consisting of from 1 to 50% by weight of an aliphatic conjugated diolefin hydrocarbon of not more than 6 carbon atoms and from 99 to 50% by weight of a polymerizable vinyl ester of an organic saturated monocarboxylic acid of less than 5 carbon atoms in which the carboxyl group is the sole substituent, said copolymer being the product obtained as set forth in claim 1.

5. A coating composition containing in aqueous dispersion a homogeneous copolymer as set forth in claim 4.

6. A tough, flexible, continuous film insoluble in benzene consisting of a homogeneous copolymer as set forth in claim 4.

7. A textile material treated with a homogeneous copolymer as set forth in claim 4.

LAWRENCE M. RICHARDS.

REFERENCES CITED

The following references are of record in the file of this patent:

UNITED STATES PATENTS

| Number | Name | Date |
|---|---|---|
| 2,144,067 | Kranzlein | Jan. 17, 1939 |
| 2,194,350 | Berg | Mar. 19, 1940 |
| 2,271,384 | Arnold | Jan. 27, 1942 |
| 2,279,436 | Berg | Apr. 14, 1942 |
| 2,416,440 | Fryling | Feb. 25, 1947 |

FOREIGN PATENTS

| Number | Country | Date |
|---|---|---|
| 339,255 | Great Britain | Dec. 1, 1930 |

OTHER REFERENCES

Carlin et al., pages 876–878, May 1946 J. A. C. S.